Patented Apr. 1, 1930

1,752,641

UNITED STATES PATENT OFFICE

BENGT RAGNAR FRITIOF KJELLGREN, OF CLEVELAND, OHIO

METHOD OF TREATING ALUMINOUS MATERIALS

No Drawing. Application filed August 23, 1924. Serial No. 733,852.

My invention relates to an improvement in a method of treating aluminous materials with sulphuric acid for the recovery of aluminum compounds therefrom.

The process consists, in brief, of sulphatization of the aluminous material, leaching out of formed sulphates, producing pure ammonium alum from the sulphate solution by crystallization, and decomposing the alum by heating, at temperatures somewhat higher than the sublimation point of the ammonium sulphate, into aluminum sulphate and ammonium sulphate, that is recovered and used again for production of ammonium alum. By producing alumina the aluminum sulphate is heated further and decomposed into alumina and sulphur dioxides. These oxides are converted into sulphuric acid, that is utilized again for the sulphatization of the aluminous raw material.

The purpose of the invention is to furnish an economical method for the production of aluminum compounds, such as aluminum sulphate and alumina, of high purity. This is accomplished by the production of pure ammonium alum, from which other aluminum compounds can be produced.

The aluminous material employed may be bauxite, kaolin, fire clay or any other material containing a considerable amount of alumina. The material may be calcined, if it is found that the calcination increases the amount of alumina rendered soluble by sulphuric acid. Calcined or not calcined it is ground to a finely divided state, so as to pass, for example, a 50 mesh sieve or finer. The material may also be calcined after grinding, and mixed hot with the sulphuric acid, in order to save the heat content of the material.

The amount of sulphuric acid used may be in excess of the theoretical amount of acid required to dissolve the alumina, if as much alumina as possible has to be dissolved, or a less amount of acid may be employed in order to utilize the acid as much as possible.

The material mixed with the sulphuric acid is heated to about 150–200° C. By this heating the colloid state of the formed silica is converted into the amorphous state, and the slime after leaching rendered easy to separate from the solution by filtration. The leaching solution may be water, or sulphuric acid, or a solution of sulphates, or a solution of ammonium salts, or a sulphuric acid solution of all these salts. Intermittent countercurrent dissolution may be used, with the material always remaining in the same leaching tank until wasted. It is also an advantage to drop the hot sulphatized material direct into the leaching tank containing the strongest solution in order to save heat. The insoluble slime is separated by filtration or otherwise. The filtrate consists of aluminum sulphate and several other sulphates, such as iron and potassium sulphates.

If pure aluminum sulphate shall be produced from this solution, the potassium sulphate is first removed by crystallization of potassium alum. After separation of these alum crystals a mother liquor remains containing very little potassium sulphate and the main part of the aluminum sulphate, if not entirely too much potassium was present. From this mother liquor the aluminum sulphate is separated by means of formation and crystallization of ammonium alum. This may be accomplished by adding to the solution ammonium sulphate or ammonium chloride, or if the solution is acid by adding ammonia and then if necessary ammonium salts. In order to crystallize all aluminum sulphate as ammonium alum the amount of ammonium sulphate present in the solution must correspond to the amount of aluminum sulphate present, thus, per one molecule of aluminum sulphate must be present one molecule of ammonium sulphate theoretically. When ammonim chloride is used, other sulphates than aluminum sulphates must provide the sulphate ions. These other sulphates are then converted into chlorides after crystallization of the ammonium alum.

The ammonium alum is crystallized either by evaporation of water, or by cooling of the hot saturated solution. On account of the high solubility of the ammonium-iron sulphates in relation to that of the ammonium alum, the alum crystals formed are very low in iron. Practically all iron can be separated from the aluminum by re-crystallization.

The mother liquor remaining after the crystallization is to some extent used for leaching the sulphatized material. The amount of mother liquor employed for this purpose depends upon the amount of impurities in the raw material brought into solution of the acid. The wasted mother liquor may be worked for the recovery of the salts, or it may be distilled with lime for the recovery of its ammonia content.

In order to produce aluminum sulphate from the ammonium alum the ammonium sulphate has to be separated. This is done by heating the pure alum up to a temperature, where ammonium sulphate evaporates and is recovered by sublimation. The alum may first be dried, and then further heated for sublimation of ammonium sulphate, or it may be dried and heated for sublimation in one operation. Practically all water is given off at a temperature of 200° C. Pure ammonium sulphate requires a temperature of about 350° C. for sublimation, but the ammonium sulphate in ammonium alum requires some higher temperature, the sublimation starting at about 425–440° C. It is preferable not to exceed the sublimation temperature of the ammonium sulphate too much, as the ammonium sulphate then is decomposed very rapidly and to large extent is converted into nitrogen, sulphur dioxide and ammonium sulphite. The control of the temperature therefore is very important for a good recovery of the ammonium sulphate.

However, even by controlling the temperature the ammonium sulphate tends to decompose to some extent. This decomposition can practically be prevented by subliming the ammonium sulphate in presence of acids, whose ammonium salts sublime with low loss of ammonia. For example, such an acid is hydrochloric acid. Gases of these acids may be passed over the heated alum. Hereby are formed the ammonium salts of the acid used, for example, ammonium chloride, and acid ammonium sulphate. The ammonium chloride may be treated with sulphuric acid and the escaping gases of hydrochloric acid utilized again for the purpose of sublimation. The products of sublimation may be precipitated in a chamber or collected otherwise.

The water of condensation from the drying of the alum may be utilized because of its heat content for the leaching operation.

After this sublimation process a pure anhydrous aluminum sulphate remains. It may be used as it is or converted into other aluminum compounds.

If alumina shall be produced from the aluminum sulphate it is heated and decomposed into alumina and sulphur oxides. Aluminum sulphate begins to decompose at about 770° C., but in order to obtain pure alumina the temperature may be raised to about 1000° C. The escaping gases, to the largest part consisting of sulphur trioxide, may be converted direct into sulphuric acid by absorption in water, or the gases may be passed over the hot aluminous material, which absorbs the gases and becomes sulphatized. By absorption of sulphur trioxide in water, the water is continuously mixed with very strong sulphuric acid, that takes up the trioxide easier than pure water. The produced sulphuric acid is used again for treating aluminous material.

Alumina may also be produced by heating the alum crystals or the dried alum direct in one operation, whereby the ammonium sulphate is sublimed at temperatures close to its sublimation point, and if necessary the sublimation carried out in presence of acids mentioned above. The sulphuric acid solution of ammonium sulphate formed may be used for treating the aluminous material, either direct or after separation of acid ammonium sulphate by crystallization.

It will thus be seen that by my process I have provided a useful and economical method for producing substantially pure aluminum compounds by decomposing ammonium alum obtained from aluminous material.

Heretofore the decomposition of ammonium alum by heating has been of small practical importance, because the alum by ordinary heating methods, for example, heating the alum in a direct fired furnace, is decomposed into alumina or basic aluminum sulphates and decomposition products of ammonia and sulphuric acid, such as nitrogen and sulphur dioxide. Especially the decomposition and loss of the costly ammonia has inhibited the use of ammonium alum for above mentioned purposes.

By my process practically all ammonia and sulphuric acid are recovered, and this fact makes ammonium alum a very valuable means of producing cheap and pure aluminum compounds.

As disclosed above the presence of certain acids upon the sublimation of the ammonium sulphate practically prevents the loss of both ammonia and sulphuric acid, if the temperature simultaneously is controlled and kept near the sublimation temperature. This is of great practical importance not only on account of the prevention of losses of ammonium sulphate but also because the sublimation temperature can be increased and thereby the rate of sublimation increased without too high losses of ammonium sulphate.

What I claim, is:

1. The method of treating an aluminous material for the recovery of aluminum sulphate therefrom, which includes treating the aluminous material with sulphuric acid at an elevated temperature, leaching out the soluble sulphates, adding to the sulphate solution an ammonium salt; crystallizating out ammonium alum; decomposing the ammonium alum into ammonium sulphate and aluminum sulphate by heating.

2. A method of treating an aluminous material for the recovery of aluminum sulphate therefrom, comprising the steps of producing ammonium alum, and decomposing the alum to form aluminum sulphate.

3. A method of treating an aluminous material for the recovery of aluminum sulphate therefrom, which consists in treating the aluminous material with sulphuric acid and extracting the soluble sulphates therefrom; in adding ammonium salt to the sulphate; in crystallizing and decomposing the resultant ammonium alum to form aluminum sulphate; and in recovering the ammonium salts and sulphuric acid.

4. A method of treating an aluminous material for the recovery of aluminum sulphate therefrom, which consists in treating the aluminous material with sulphuric-acid and an ammonium salt; in extracting the soluble salts and crystallizing and decomposing the product to form aluminum sulphate; and in recovering the ammonium salts and sulphuric acid.

5. A method of treating an aluminous material for the recovery of aluminum sulphate therefrom, comprising the steps of decomposing ammonium alum to form aluminum sulphate by heating in presence of acids whose ammonium salts sublime with low loss of ammonia; and recovering the formed ammonium salts, and the acid employed for the sublimation.

6. A method of treating an aluminous material for the recovery of aluminum sulphate therefrom, comprising the step of decomposing ammonuim alum to form aluminum sulphate by heating in presence of acids whose ammonium salts sublime with low loss of ammonia.

7. A method of treating an aluminous material for the recovery of aluminum sulphate therefrom, comprising the steps of decomposing ammonium alum to form aluminum sulphate by heating at temperatures close to the sublimation point of ammonium sulphate combined in ammonium alum; and recovering the sublimed ammonium sulphate.

8. A method of treating an aluminous material for the recovery of aluminum sulphate therefrom, comprising the step of decomposing ammonium alum to form aluminum sulphate by heating at temperatures close to the sublimation point of ammonium sulphate combined in ammonium alum.

9. A method of treating an aluminous material for the recovery of aluminum sulphate therefrom, comprising the steps of decomposing ammonium alum to form aluminum sulphate by heating; and recovering the sublimed ammonium sulphate.

10. A method of treating an aluminous material for the recovery of aluminum sulphate therefrom, comprising the step of decomposing ammonium alum into aluminum sulphate and ammonium sulphate by heating.

11. In the process of obtaining aluminum compounds from aluminous material, the steps of forming ammonium alum, and decomposing the alum into ammonium sulphate and aluminum sulphate, and recovering the ammonium sulphate.

12. The process of obtaining aluminum sulphate from aluminous material, comprising forming ammonium alum from the aluminous material and decomposing the ammonium alum to form sulphates of aluminum and ammonium.

13. The process of obtaining aluminum sulphate from aluminous materials comprising the steps of forming ammonium alum from the aluminum in the material and decomposing the ammonium alum by heating at a temperature close to the sublimation temperature of ammonium sulphate combined in ammonium alum, and recovering the ammonium sulphate.

14. A method of decomposing ammonium alum to form salts of aluminum and ammonium and to recover the sulphuric acid, which comprises heating the ammonium alum at a temperature sufficient to cause sublimation of the ammonium sulphate of the ammonium alum without substantial decomposition, and recovering the sublimed ammonium sulphate.

15. The process of obtaining aluminum sulphate from aluminous material, comprising forming ammonium alum from the aluminum in the material and decomposing the ammonium alum to form aluminum sulphate in the presence of an acid, the ammonium salt of which sublimes with low loss of ammonia, whereby the ammonium salts formed from the alum and the acid used may be recovered.

16. A method of decomposing ammonium alum to form salts of aluminum and ammonium and to recover the sulphuric acid, which comprises heating the ammonium alum at a temperature sufficient to cause sublimation of the ammonium sulphate of the ammonium alum without substantial decomposition in the presence of an acid, the ammonium salt of which sublimes with low loss of ammonia, whereby the ammonium salts formed and the acid used may be recovered.

17. The process of treating an aluminous material for the recovery of aluminum sulphate therefrom, which comprises introducing into a sulphate solution of the aluminous material ions of ammonium to form ammonium alum, separating the alum from the solution, decomposing the ammonium alum by heating to form aluminum sulphate, and recovering the ammonium and the acid content of the ammonium sulphate as salts of ammonium.

18. The process of treating an aluminous material for the recovery of aluminum sulphate therefrom, which comprises introducing into a sulphate solution of the aluminous material ions of ammonium to form ammonium alum, separating the ammonium alum from the solution and decomposing the alum to form aluminum sulphate and salts of ammonium.

In testimony whereof I affix my signature.
BENGT RAGNAR FRITIOF KJELLGREN.